US011347098B2

(12) United States Patent
Banaei et al.

(10) Patent No.: US 11,347,098 B2
(45) Date of Patent: May 31, 2022

(54) INTERFERENCE FILTER FILM FOR DISPLAY APPLICATIONS (71) Applicant: Everix, Inc., Orlando, FL (US)

(72) Inventors: Esmaeil Banaei, Oviedo, FL (US); Sean Northrup, Orlando, FL (US)

( * ) Notice: Subject to any disclaimer, the term of this patent is extended or adjusted under 35 U.S.C. 154(b) by 0 days.

(21) Appl. No.: 15/775,192

(22) PCT Filed: Nov. 17, 2016

(86) PCT No.: PCT/US2016/062413
§ 371 (c)(1),
(2) Date: May 10, 2018

(87) PCT Pub. No.: WO2017/087604
PCT Pub. Date: May 26, 2017

(65) Prior Publication Data
US 2018/0341146 A1 Nov. 29, 2018

Related U.S. Application Data (60) Provisional application No. 62/257,129, filed on Nov. 18, 2015.

(51) Int. Cl.
G02F 1/1335 (2006.01)
G02F 1/1333 (2006.01)
(Continued)

(52) U.S. Cl.
CPC ...... *G02F 1/133514* (2013.01); *G02F 1/1347* (2013.01); *G02F 1/13473* (2013.01);
(Continued)

(58) Field of Classification Search
CPC ......... G02F 1/133514; G02F 1/133308; G02F 1/1347; G02F 2001/133521; G02B 5/286
See application file for complete search history.

(56) References Cited

U.S. PATENT DOCUMENTS 4,606,612 A 8/1986 Iizuka
6,531,230 B1 * 3/2003 Weber .................. B32B 7/02
428/480
(Continued)

FOREIGN PATENT DOCUMENTS

CN 201707457 1/2011
EP 0 154 953 A2 9/1985
(Continued)

OTHER PUBLICATIONS

Supplementary Partial European Search Report for European Application No. 16867097.4, dated May 29, 2019, 15 pgs.
(Continued)

*Primary Examiner* — Nathanael R Briggs
(74) *Attorney, Agent, or Firm* — Arthur Robert Weaver; The Brickell IP Group, PLLC (57) ABSTRACT An optical filter for a display includes a filter film with at least one optical filter layer. The filter layer blocks a band of optical wavelengths and is transparent for optical wavelengths outside the band. The filter film has a thickness within the range of 25 microns through 1 mm. The filter film may include one or more laminate layers that are optically transparent in the wavelengths of the band blocked by the filter layer. The filter film may include one or more layers of liquid crystal polymers in layered contact with one or more transparent electrode layers and one or more layers of polymers in layered contact with the one or more layers of liquid crystal polymers.

18 Claims, 5 Drawing Sheets (51) Int. Cl.
*G02F 1/1347* (2006.01)
*G02B 5/28* (2006.01)

(52) U.S. Cl.
CPC .. *G02F 1/133308* (2013.01); *G02F 1/133365* (2013.01); *G02F 1/133509* (2013.01); *G02B 5/286* (2013.01); *G02F 1/133331* (2021.01); *G02F 1/133521* (2021.01); *G02F 2203/055* (2013.01)

(56) References Cited

U.S. PATENT DOCUMENTS

| | | | | |
|---|---|---|---|---|
| 6,774,963 | B1* | 8/2004 | Nakao | G02F 1/133514 349/104 |
| 6,965,191 | B2 | 11/2005 | Koike et al. | |
| 8,044,942 | B1 | 10/2011 | Leonhard et al. | |
| 2007/0146576 | A1* | 6/2007 | Hasegawa | G02F 1/133365 349/88 |
| 2009/0046363 | A1 | 2/2009 | Wang | |
| 2010/0265214 | A1* | 10/2010 | Green | G06F 3/045 345/174 |
| 2013/0050622 | A1* | 2/2013 | Yoshihara | G02F 1/13476 349/123 |
| 2014/0235327 | A1 | 8/2014 | Aoki et al. | |
| 2015/0070629 | A1* | 3/2015 | Asaoka | G02F 1/137 349/70 |
| 2016/0033687 | A1* | 2/2016 | Wakizaka | G02B 5/3033 359/507 |
| 2016/0170114 | A1* | 6/2016 | Watano | G02B 5/3016 349/69 |
| 2016/0320621 | A1* | 11/2016 | Biteau | G02B 5/22 |
| 2016/0377902 | A1* | 12/2016 | Min | G02F 1/13439 349/16 |

FOREIGN PATENT DOCUMENTS

| | | |
|---|---|---|
| JP | H10-048605 | 8/1996 |
| JP | 2000-028827 | 7/1998 |
| JP | 2000-147477 | 11/1998 |
| JP | 2000-162636 | 12/1998 |
| JP | 2001-186443 | 12/1999 |
| JP | 2002-251144 | 1/2001 |
| JP | 2003-344634 | 3/2003 |
| JP | 2010-002481 | 6/2008 |
| WO | WO 99/36258 A1 | 7/1999 |

OTHER PUBLICATIONS

United States Patent and Trademark Office, Alexandria, Virginia, International Search Report of International Application No. PCT/US2016/062413, dated Jan. 19, 2017, 2 pages.

Tarrant, S., "Screening Out the Blue," EyeCare Business Magazine, Sep. 2013, 6 pages (http://www.eyecarebusiness.com/articleviewer.aspx?articleID=108841.

Supplementary European Search Report for European Application No. 16867097.4, dated Oct. 9, 2019, 16 pgs.

Jian Feng, et al, "Single Layer Reflective Polarizers with Electrically Controlled Spectrum", 1999 SID International Symposium, May 18-20, 1999, San Jose, CA, May 18, 1999, 4 pgs.

Office Action from corresponding Japanese application No. 2018-545128, dated Feb. 6, 2020, in Japanese language, 4 pages.

Office Action from corresponding Japanese application No. 2018-545128, dated Feb. 6, 2020, Informal English language translation, 5 pages.

* cited by examiner

INTERFERENCE FILTER FILM FOR DISPLAY APPLICATIONS

TECHNICAL FIELD

The present application describes an interference filter film for display applications, in particular for illuminated screens.

BACKGROUND

Several types of displays require high-performance (high selectivity) light filtering for various reasons. Regular LED backlit displays (e.g., phones, tablets, laptops, TV sets, desktop monitors and other digital displays) have blue LED components with radiation that is harmful to eyes, brain and general health. Certain displays have emissions above 600 nm that need to be blocked for applications in military, automotive industry, etc. Some types of displays with phosphor or other light converting materials in their pixels that are excited by blue or UV light need to contain and block the excessive excitation light from leaving the screen surface. A selective light filter can enhance color contrast in certain display units. Similarly, a selective light filter may improve display contrast and visibility in outdoor environments with abundant ambient light. Another example is a selective light filter that helps colorblind people to see colors with higher contrast and distinction by blocking the portion of the emitted light spectrum that confuse brain due to overlapping sensitivity curves of retinal cone and rod cells.

High-performance filters that are needed in such cases must be thin-film interference filters comprising several sub-wavelength layers. Traditional methods of producing high-performance thin-film filters are based on vacuum deposition methods such as Ion-Beam Sputtering. These methods are widely used to produce hard-coated filters on rigid substrates used in a wide variety of applications and industries. However, display industry can hardly use traditional filters for a few reasons: 1) rigid filters cannot be simply integrated into the construction of a display cover, 2) existing thin-film-coated optical filters are typically on thick glass substrates that can be too bulky and heavy for display applications, 3) traditional filter manufacturing processes present several technical challenges such as cracking under bending stress that makes them inappropriate for display integration, and 4) traditional vacuum-deposition-based manufacturing is not economically viable for large-volume production of filters with large surface areas for display applications.

95% of Americans look at LED screens during night time, whether on computers, laptops, tablets or smart phones. 63% of Americans are not getting enough sleep. Similar statistics can be found around the world. Human eyes are naturally designed for processing much smaller doses of light at night, especially certain portions of the blue light spectrum. A lower intensity of blue light will result in an increase in our normal melatonin hormone level. Melatonin will, in turn, make us feel tired enough to get a good night's sleep.

Excessive blue light from LED screens tricks our brain into thinking daytime has been prolonged, confusing our internal clock that regulates sleep and wake patterns. Screen time at night has shown significant drops in this regulatory hormone increasing the risk for depression, stress, insomnia, sleep deprivation, and in many cases weight gain, diabetes and certain cancers (breast, ovarian and prostate).

People of all ages are affected by blue light. Young teens and adolescents, however, are more prone to the harmful effects of blue light because their eyes work more efficiently causing a higher sensitivity to this particular light.

The most harmful part of the blue light that is emitted from most displays and causes several health issues is mostly confined to the wavelength range 460 nm to 480 nm. Spectrally, this is an area on the tails of blue LED radiation spectrum in displays. Current solutions to this problem include dimming through software of the blue LED causing a change in the display color and color temperature. However, since the blue LED component, in a vast majority of modern displays, provides excitation energy for the green and red LEDs too, it is impossible to turn the blue LED off or sufficiently dim it to eliminate the harmful radiation in the range 460 nm-480 nm.

SUMMARY

With the advent of all-plastic thin-film interference filters made through thermal drawing process, the present application proposes thin-film filter films for display applications.

According to the present disclosure, an optical filter for a display includes a filter film with at least one optical filter layer. The filter layer blocks a band of optical wavelengths and is transparent for optical wavelengths outside the band. The filter film has a thickness within the range of 10 microns through 1 mm. The filter film may include one or more laminate layers that are optically transparent in the wavelengths of the band blocked by the filter layer. The filter film may include one or more layers of liquid crystal polymers in layered contact with one or more transparent electrode layers and one or more layers of polymers in layered contact with the one or more layers of liquid crystal polymers.

These and other objects, features and advantages of the subject matter herein will become clearer when the drawings as well as the detailed description are taken into consideration.

BRIEF DESCRIPTION OF THE DRAWINGS

For a fuller understanding of the nature of the present invention, reference should be made to the following detailed description taken in connection with the accompanying drawings.

Like reference numerals refer to like parts throughout the various views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Aspects of the present disclosure address the need for thin-film optical coatings or hybrid filters comprising both thin-film coatings and absorptive materials. The embodiments set forth below may employ thermally drawn optical filters to be used for any display application, such as, but not limited to, LED displays. All such applications, and similar ones, require very selective optical filters that block certain portions of the light spectrum without noticeably affecting other parts of the spectrum with reflection, absorption and transmission levels that are well controlled by design.

In some embodiments, filter films 10 are made of thermoplastics and/or glass materials, though other materials may be appropriate (or developed in accordance with known processes or technologies) for certain applications. The filter films can be adapted as a direct cover on screens. In some embodiments, the filter film 10 has a bending flexibility allowing the filter film 10 to be applied bubble-free and to be peeled off from a planar surface.

Figure 1A:
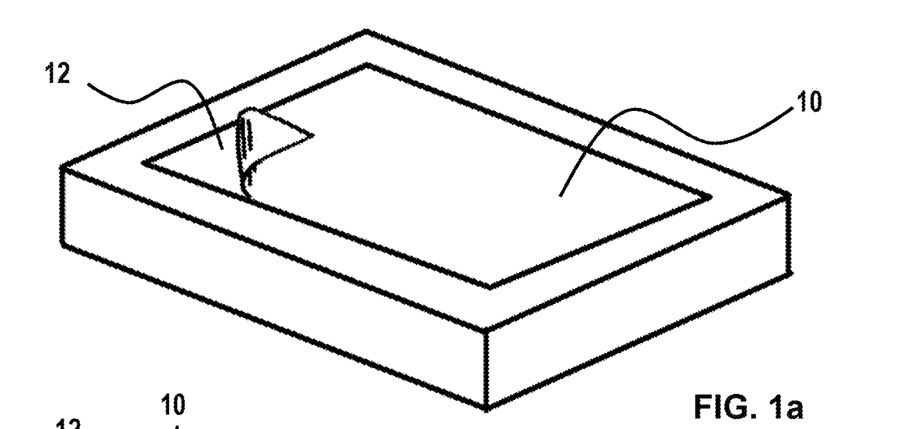
FIGS. 1*a* and 1*b* illustrate an embodiment of a filter film.
Figure 1B:
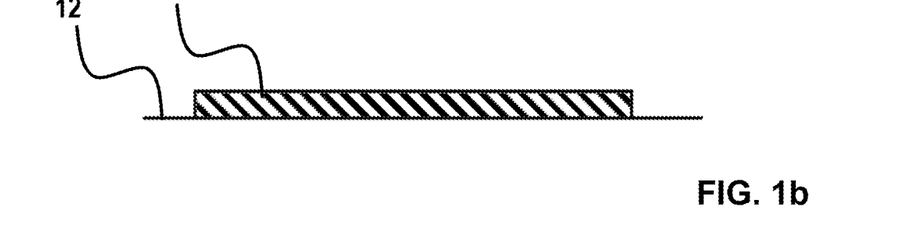
Figure 2A:
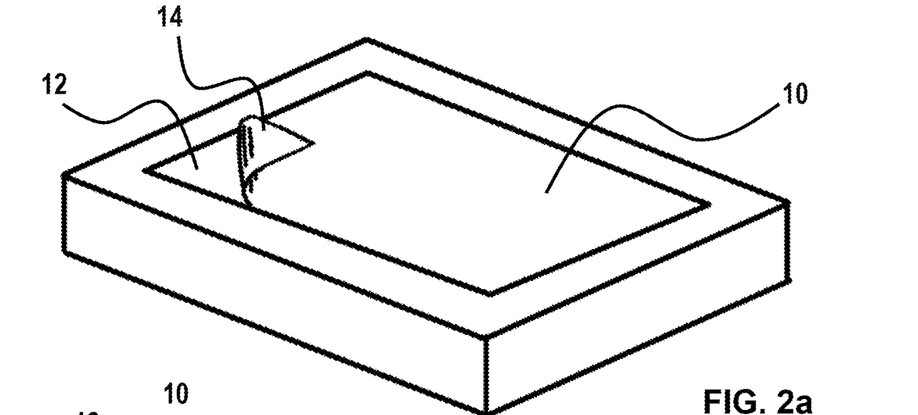
FIGS. 2*a* and 2*b* illustrate an embodiment of a filter film with an adhesive layer.
Figure 2B:
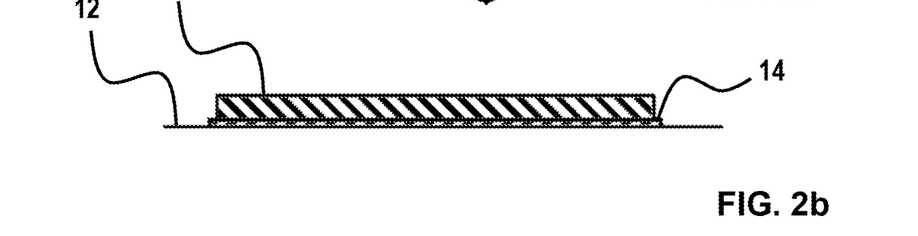

The filter film 10 can be laminated with or without an additional adhesive layer 14 for retaining the filter film on the display surface 12 directly. For example, the filter film 10 of FIG. 1a adheres directly to display surface 12 via static cling. Alternatively, as shown in FIGS. 2a and 2b, the filter film 10 may additionally include an adhesive layer 14 for attachment on the display surface 12. The adhesive layer 14 is of a thickness and strength that ensures attachment of the filter film 10 to the display surface 12, but that allows residue-free removal of the filter film 10 from the display surface 12. The adhesive layer 14 is preferably pressure-activated.

Alternatively, the filter films may be integrated within the structure of a display panel itself, such that external application or adhesion is not necessary. Various methodologies are known in the art for laminating multiple layers of polymers or polymeric liquid crystal substrates in display panel construction applications; the present disclosure is not intended to be limited by any particular display panel manufacturing techniques or processes.

In some embodiments, polymers or glass materials may be utilized in the filter films 10 such that passive filtering or certain spectrum(s) of light is provided (without need for electrical voltage application).

Figure 3:
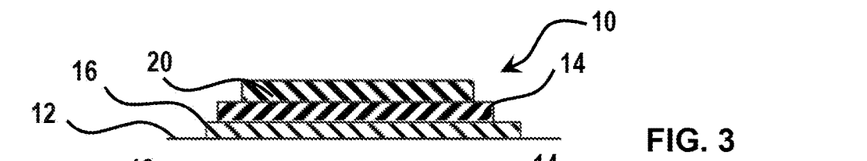
FIG. 3 illustrates an embodiment of a filter film with a secondary laminate layer.

In some embodiments that may include removable filter films 10 or filter films 10 incorporated in a display screen, the filter films 10 are laminated with a secondary laminate layer 16 or sandwiched between a pair of secondary laminate layers 16 and 18, with or without an added adhesive layer 14 for adhesion to a display. For example, FIG. 3 shows an assembly of a filter layer 20 and a first laminate layer 16. An intermediate adhesive layer 14 bonds the filter layer 10 to the laminate layer 16. The laminate layer 16 may, for example, provide the properties for sufficient static cling to the display surface 12. The intermediate adhesive layer may be, without limitations, heat-activated, light-activated, or pressure-activated. Unlike the adhesive layer for attachment to the display surface 12, the intermediate adhesive layers are activated in the manufacturing process, where various techniques can be applied.

Figure 4:
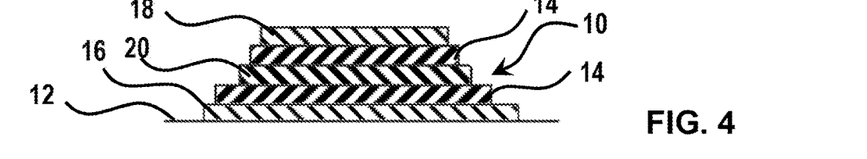
FIG. 4 illustrates an embodiment of a filter film with two secondary laminate layers.

Additionally or alternatively, a second laminate layer 18 may be provided on the side of the filter layer 20 that is remote from the display surface 12. FIG. 4 shows the second laminate layer 18 in addition to the first laminate layer 16. If the filter layer itself includes sufficient static cling properties or if the filter film is integrated into a display, the first laminate layer 16 may be unnecessary.

Figure 5:
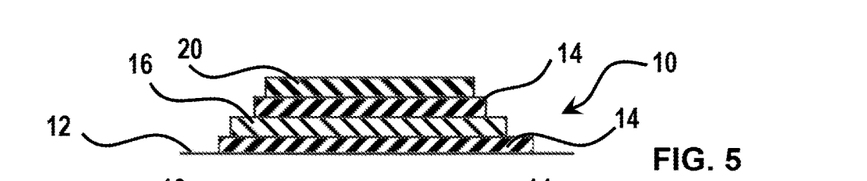
FIG. 5 illustrates an embodiment of a filter film a secondary laminate layer and an adhesive applied to one surface.
Figure 6:
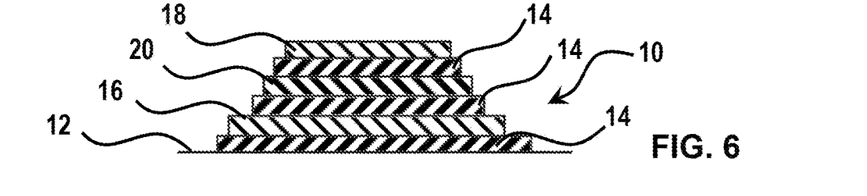
FIG. 6 illustrates an embodiment of a filter film with two secondary laminate layers and an adhesive applied to one surface.

FIGS. 5 and 6 correspond to FIGS. 3 and 4, except that the filter film 10 includes an adhesive layer for attaching the filter film 10 to the display surface 12. These four illustrations provide only a few of the possible combinations of laminate layers with filter layers. It is further possible to include more than one filter layer within the same filter film for providing light filtering in different wavelength ranges.

These laminated or sandwiched structures can be applied to a display surface 10. The laminate layers 16 and 18 can be selected for additional mechanical (strength and scratch resistance) or adhesive properties, for further protection of the display surface 12, or for further protection of the filter layer 20 itself. As noted above, scratch or abrasion resistance characteristics of a particular laminate layer 16 and 18 may prevent damage to the filter film, the display panel, or both, and so may inform or influence the type of material selected for a particular layer.

Figure 7:
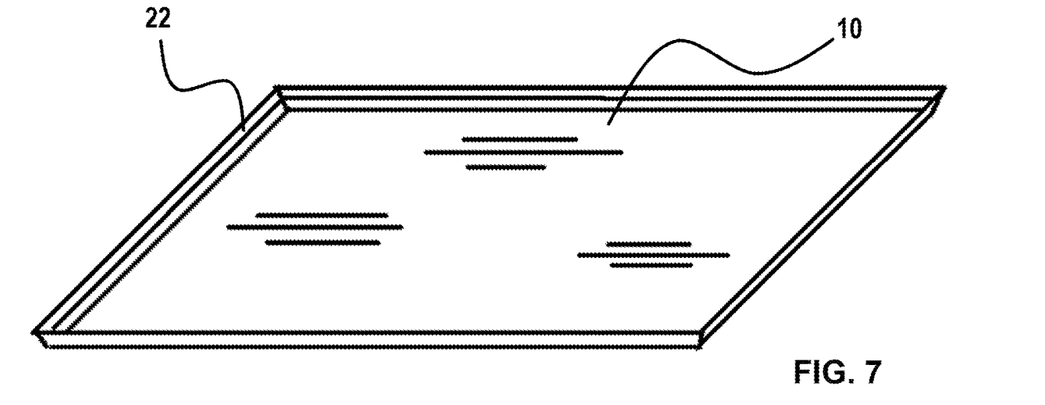
FIG. 7 illustrates an embodiment of a filter film in a frame.
Figure 8:
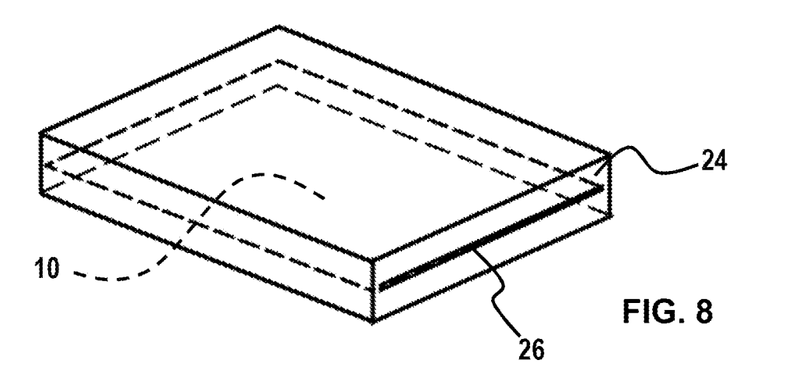
FIG. 8 illustrates an embodiment of a filter film integrated into a device case.
Figure 9:
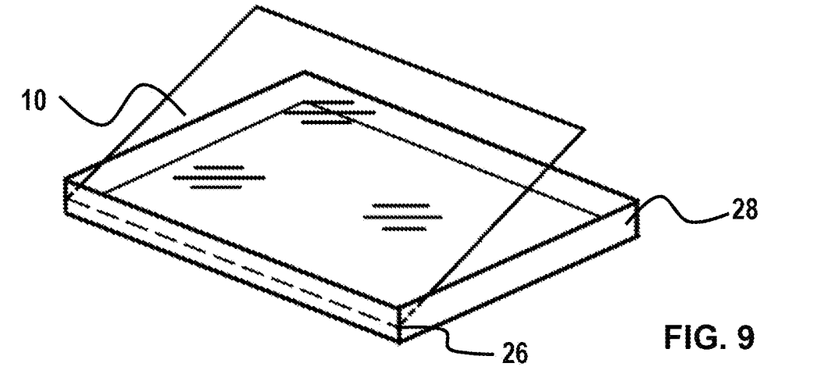
FIG. 9 illustrates a further embodiment of a filter film integrated into a device case.
Figure 10:
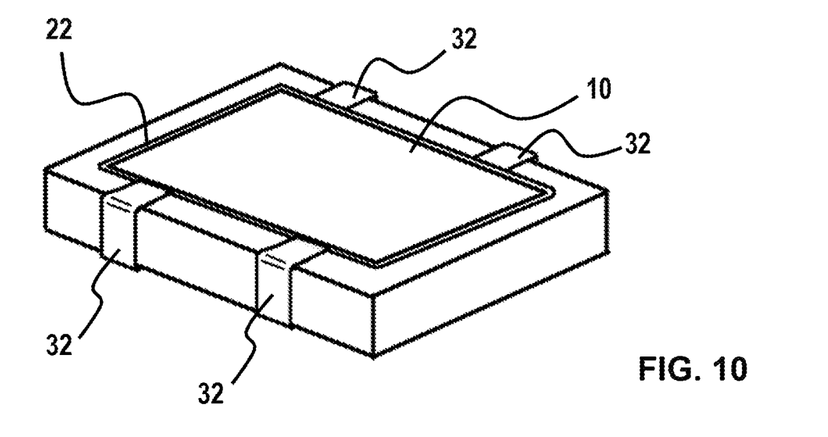
FIG. 10 illustrates an embodiment of a filter film mounted to a device with bands.

In further embodiments, as illustrated in FIG. 7, the filter film 10 (with the filter layer 20 and optionally with additional layers 16 and 18 and adhesive layers 14 therebetween) can be integrated into a frame 22 for mounting on displays or devices. Such filter films 10 can also be integrated into a device case, as schematically shown in FIGS. 8 and 9. For example, the filter film (with the additional layers, if any) can be integrated into device covers or sleeves such that the device can be placed inside the cover or sleeve temporarily and be removed when needed. As shown in FIG. 8, a device case 24 may include an insertion slot 26 for replacing the filter film 10 with an identical new one if the filter film 10 is worn, or with a different one for filtering out different wavelengths of light. FIG. 9 shows a different device case 28, to which the filter film 10 is attached via a hinged connection 30. FIG. 10 shows an example, in which the filter film 10 includes a different attachment feature in the form of elastic bands 32 forming loops placed around the device to place the filter film 10 on the display surface. The length of the elastic bands 32 forming the loops depends on the size of the device. In the example of FIG. 10, the filter film 10 includes a frame 22 for attaching the elastic bands 32. If the filter film itself has sufficient physical integrity, the elastic bands may be attached to the filter film 10 itself without using the frame 22.

The mechanism of integration of the filter film 10 into device cases, such as device cases 24 and 28, covers, or sleeves can be fixed or modular. Modular integrations allow for the removal and/or replacement of the filter film. Modular integration can include filter films 10 that can slide onto a case, cover or sleeve (as in the example shown in FIG. 8). The filter film 10 can be mounted in frames 22 attached to the rest of a case, cover or sleeve using hinges (as in the example shown in FIG. 9). Filter films can be mounted in frames 22 attached to the rest of a case, cover or sleeve using bands or rubber holders (as in the example of FIG. 10). Other options of mounting the filter film include frames attached to the rest of a case, cover or sleeve using snap-on features; and/or hook-loop fastening fabrics or bands or other fastening elements.

In some embodiments, the frame 22, in which the filter film 10 is mounted is adapted to be removable from the filter film 10. The frame 22 (with the filter film 10) can be replaceable in case only the part including the filter film 10 is worn out or has lost quality. The frame 22 (with the filter film 10) can also be replaceable in case more than one type of filter needs be used on a device display for various purposes or for various levels of light blocking for a certain purpose. For example, if the filters are used for eye care purposes, one filter film 10 can be made with a spectrum that blocks a range of wavelengths around 450 nm for slowing age-related macular degeneration (AMD) development, while another filter film 10 made for blocking the range around 470 nm for preventing sleep disruption as a result of melatonin suppression triggered by that range of blue light.

In further embodiments, filter films 10 may be laminated or integrated into the layers of a device display unit as an integrated part of the device as noted above. In still further embodiments, filter films 10 may be used as a multi-functional layer in a display unit, acting as both the top cover of the display unit and the light filter. Likewise, the filter films 10 can be used as a multi-functional add-on cover both to protect the device surface from shock, scratch or aberration and to filter undesired light for various applications.

Filter layer thicknesses are determined by the application and the desired spectral specs. The filter layer 20 may vary from being much thinner than typical adhesive layers 14 to comparable thickness, and in rare situations to a greater thickness than the adhesive layers 14. Adhesives are usually sold in various thicknesses depending on how much strength is needed. For the intermediate adhesive layers 14 (in the construction of the stack including protective layers 16 and 18) thicker adhesives may be better, so the layers 16, 18, and 20 do not easily come apart. But for the final adhesive layer 14 that makes the filter film 10 adhere to the exterior of a display surface 12, a weak, thin adhesive may be better (unless permanent adhesion is desired). Adhesives are usually from 1 mil (25 microns) to 5 mils (125 microns). The filter film 10 alone can be anywhere from less than 25 microns, even 10 microns, to hundreds of microns, up to 1 mm.

Figure 13:
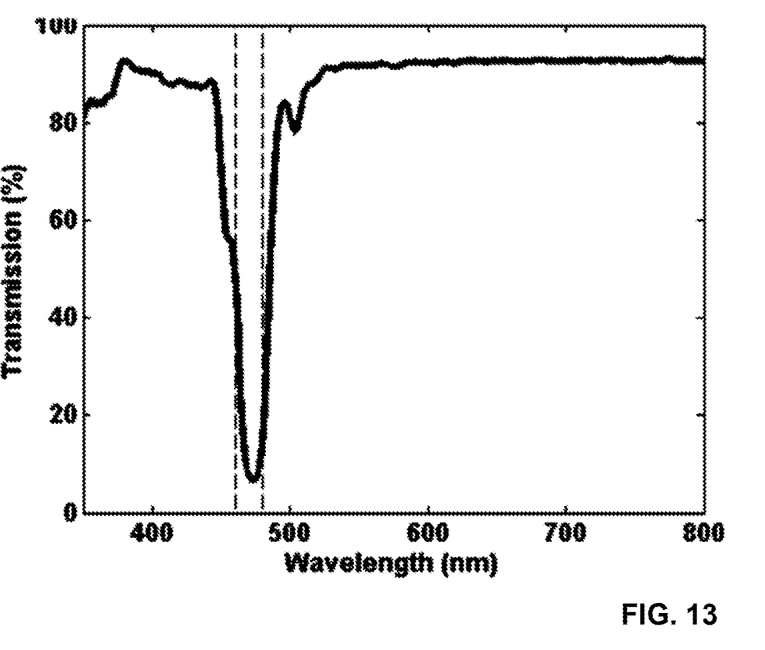
FIG. 13 shows a graph illustrating the filtering performance of certain filter embodiments.
Figure 14:
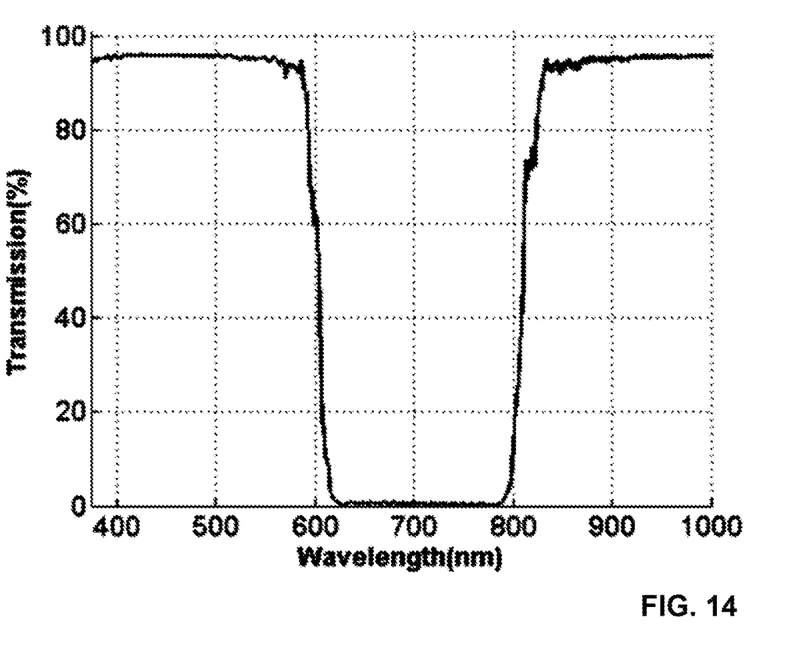
FIG. 14 shows a graph illustrating the filtering performance of certain filter embodiments.

It is also an aspect of the present disclosure that the filter films can be designed to filter a variety of specific wavelengths and not be limited to a specific spectral curve. For example, FIGS. 13 and 14 show examples of filter performance obtainable by the filter films 10 of the present invention for various display applications. These results may be achieved through selection of materials having desired attenuation characteristics, either individually or in combination, as will be appreciated from the foregoing description.

Filter films 10 with only an individual filter layer 20 or multi-layer stack constructions including the filter layers 20 and one or more additional laminate layers 16 and 18 subject to this disclosure can be in the thickness range from 10 micrometers to 1 millimeter depending on the spectral requirements of the filter for a specific purpose and the level of mechanical flexibility required for any of the specific integration approaches described in this disclosure.

Transverse dimensions (length and width) of the filter films 10, and therefore display units to which the filter films can be applied may be in the range 1 mm (e.g., for miniaturized display units used in head-mount displays and wearable technology tools) to 3 meters (e.g., for large-format indoor and outdoor displays or displays integrated onto automotive or building glasses). Intermediate-size displays (and applicable filter films) can include those for hand-held mobile devices, tablet, laptops, desktop computers and televisions.

The spectral wavelengths, around which transmitted or blocked bandwidths are arranged can be as low as 200 nm (UV spectral range for blocking excitation light in certain display methods) up to 1800 nm (Near Infra-Red spectral range for controlling emission from military displays). Intermediate spectral ranges cover the visible spectrum (380 nm-750 nm) for controlling light from most commercial displays. The blocked bandwidths (with "blocking" being defined as removing 20% or more of the light intensity) around the above mentioned spectral wavelengths may be, without limitations, as narrow as 10 nm or as wide as 400 nm.

Figure 11:
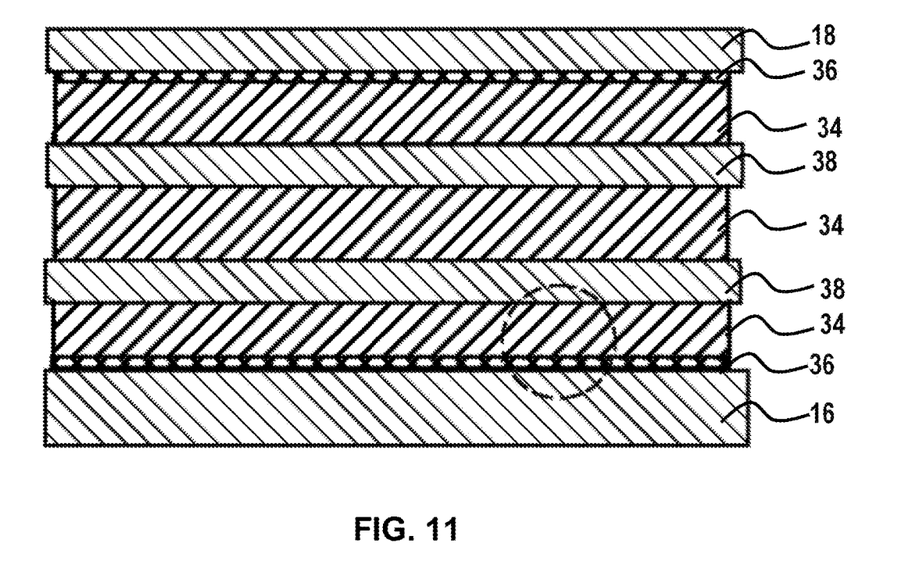
FIG. 11 illustrates an embodiment of a tunable filter film.

In one aspect, an embodiment shown in FIG. 11 may provide a filter film 10 for selective light filtering comprising one or more layers 34 of liquid crystal polymers in contact, or layered contact, with one or more integrated transparent electrode layers 36. In some embodiments, one or more intermediate layers 38 of polymers are in layered contact with the one or more layers 34 of liquid crystal polymers in addition to the first laminate layer 16 and the second laminate layer 18 forming the outer surfaces of the filter film 10.

Figure 12A:
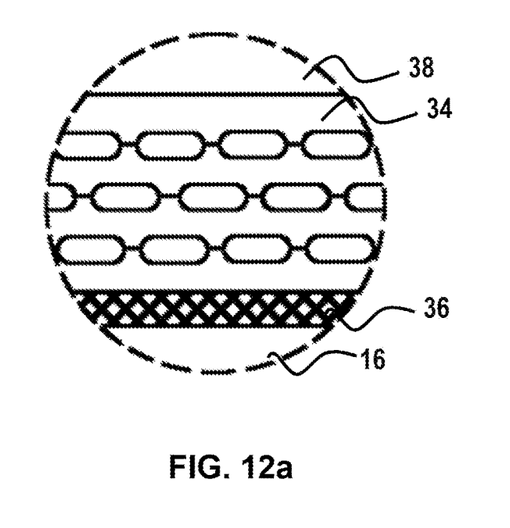
FIG. 12*a* illustrates a detail view of a tunable filter film in a first state.
Figure 12B:
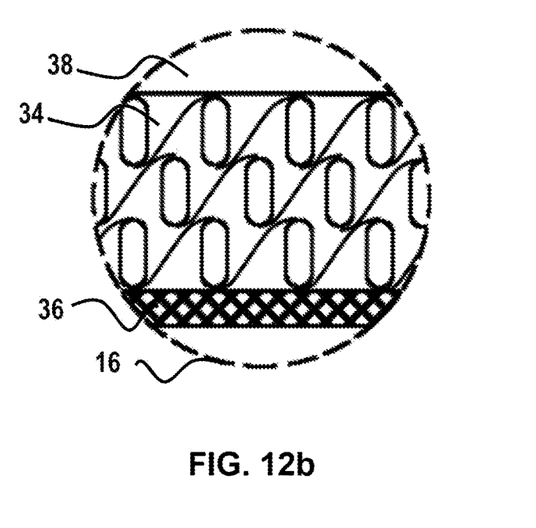
FIG. 12b illustrates a detail view of the tunable filter film of FIG. 12a in a second state.

Aspects of the technology set forth in the present disclosure are related to a filter film 10 that may be operative selectively to block, impede, regulate, or otherwise to attenuate a portion of the light spectrum that affects the sleep cycle. Embodiments of the filter film 10 are transparent with minimal color change to the backlit screen in connection with which it is intended to be used, e.g. cellular phone LED screens, computer displays, television panels, and other emissive technologies that produce or allow generation of light in the relevant range of the electromagnetic spectrum. The disclosed filter films may generally comprise layers 34 of liquid crystal polymers with transparent electrode layers 36 (such as, e.g., Indium Tin Oxide); in some instances, such electrode layers 36 may be disposed on both (opposing) sides of the filter film 10 such that electric voltage can be applied to the filter in order to tune filter properties, as illustrated in FIGS. 11, 12a, and 12b, providing active filtering capabilities. In FIGS. 11, 12a, and 12b, adhesive layers may be present in analogy to FIGS. 3 through 6.

Liquid crystalline polymers are polymeric materials with chains of monomers which have liquid crystalline properties, making them responsive to electric fields applied to them. Liquid crystalline materials (including liquid crystalline polymers) demonstrate anisotropy in their refractive indices such that the effective refractive index experienced by an incident light varies depending on the molecular orientations in the material. Molecular orientations can be controlled via stimuli such as external electric field application. In one embodiment, at least one layer 34 of the alternating layers in a multi-layer filter structure is made of liquid crystal polymer, while other layers 38 are regular polymers. In some situations, it may be desirable that the ordinary (or extra-ordinary) refractive index of the liquid crystal polymer layer is selected such that it matches with the refractive index of a regular polymer that forms intermediate layers 38 or outer laminate layers 16 and 18. Little (or no) refractive index contrast between layers of a multi-layer filter will provide a clear film without significant filtering properties.

As further illustrated in FIGS. 11, 12a, and 12b, in one embodiment as shown in FIGS. 11, 12a, and 12b, a liquid crystalline polymer layer 34 with positive anisotropy can be used such that when no voltage is applied to the filter film 10, the liquid crystalline molecules align horizontally in the plane of the filter film 10 as shown in FIG. 12a. When an electric voltage (field) is applied to the film, the liquid crystalline polymer molecules will re-orient themselves partially to respond to the electric field. For example, when voltage is applied, the liquid crystal polymers can align vertically with respect to the plane of the filter film as shown in FIG. 12b or transverse to the plane of the filter film 10 at another angle. In an alternative embodiment, the liquid crystalline polymer molecules with negative anisotropy may line up parallel to the layers of the filter film 10 as shown in FIG. 12a when electric field is applied, and they will line up perpendicular to the layers when electric field is removed as shown in FIG. 12b.

Materials may be chosen such that the extra-ordinary (or ordinary) refractive index of the liquid crystal polymer no longer matches that of the regular polymer in alternating layers. In embodiments, the periodic refractive index profile in the filter stack will cause selective light filtering with specifications dependent on the structure of layers, choice of materials, and applied electric field. It is noted that the specific polymers selected for each or any of the layers in a multi-layer structure may be selected in accordance with necessary or desired light transmission and blocking properties, refractive indices, cost profiles, strength, rigidity, or scratch resistance characteristics, or a combination of these and other factors. The present application is not intended to be limited by the specific polymers or polymeric materials selected for particular layers in a film structure.

Without further elaboration, it is believed that one skilled in the art can, using the preceding description, utilize the disclosed technology to its fullest extent. Any one or more of the features of the previously described embodiments can be combined in any manner with one or more features of any other embodiments. Furthermore, many variations will become apparent to those skilled in the art upon review of the specification.

It is to be appreciated that the foregoing Detailed Description section, and not the Abstract section, is intended to be used to interpret the claims. The Abstract section may set forth one or more, but not all, exemplary embodiments as contemplated by the inventor(s), and thus, is not intended to limit the description and the appended claims in any way.

The foregoing description of the specific embodiments should fully reveal the general nature of the technology so that others can, by applying knowledge within the skill of the art, readily modify and/or adapt for various applications such specific embodiments, without undue experimentation, without departing from the general concepts set forth above. Since many modifications, variations and changes in detail can be made to the described implementations, it is intended that all matters in the foregoing description and shown in the accompanying drawings be interpreted as illustrative and not in a limiting sense. Thus, the breadth and scope of the present disclosure should not be limited by any of the above-described exemplary embodiments, but should similarly be defined only in accordance with the following claims and their equivalents.

What is claimed is:

1. A filter film including:
   at least one thermally-drawn optical interference filter layer, the optical filter layer including one or more liquid crystal polymer layers, the one or more liquid crystal polymer layers include crystalline polymer molecules configured to block certain wavelenghts by interference effect, the liquid crystalline polymer molecules are aligned at an angle transverse to the filter layer absent an electric field and align parallel to the filter layer upon application of an electric field,
   a first laminate layer bonded to the optical filter layer,
   a second laminate layer bonded to the optical filter layer,
   wherein the first and second laminate layers are optically transparent in the wavelengths of the band blocled by the optical filter layer,
   wherein the interference filter blocks a band of optical wavelengths and is transparent for optical wavelengths outside the band, and
   wherein the filter film has a thickness within the range of 10 microns through 1 mn.

2. The filter film of claim 1, wherein the blocked band has a bandwidth between 10 and 400 nm.

3. The filter film of claim 1, wherein the blocked band includes a wavelength of 470 nm.

4. The filter film of claim 1, wherein the first laminate layer is bonded to the interference filter layer via an adhesive optically transparent in the wavelengths of the band blocked by the filter layer.

5. The filter film of claim 1, wherein the second laminate layer has a scratch-resistant outside surface.

6. The filter film of claim 1, wherein the interference filter layer is sandwiched between the first and second laminate layers.

7. The filter film of claim 1, wherein the first laminate layer has static cling properties when contacting a smooth surface.

8. The filter film of claim 1, wherein the first laminate layer has an outside surface with an adhesive layer.

9. The filter film of claim 1, wherein the filter film has a bending flexibility allowing the filter film to be peeled off from a planar surface.

10. The filter film of claim 1, wherein the optical interference filter layer includes at least two layers.

11. The filter film of claim 1, wherein the one or more liquid crystal polymer layers include at least two liquid crystal polymer layers, the optical filter layer further including at least one intermediate polymer layer between the liquid crystal polymer layers.

12. The filter film of claim 1, wherein the filter film further includes at least one transparent electrode layer.

13. The filter film of claim 1, further comprising a frame removably holding the filter film.

14. The filter film of claim 13, wherein the frame includes attachment features for attaching the frame to a display screen.

15. The filter film of claim 2, wherein the filter film is configured to be transparent to wavelengths above and below the blocked band.

16. The filter film of claim 1, wherein the optical filter layer includes a multiple layer film that includes the one or more liquid crystal polymer layers.

17. The filter film of claim 16, wherein:
the multiple layer film that includes multiple regular polymer layers interspersed with the one or more liquid crystal polymer layers, and
the multiple regular polymer layers are characterized by a refractive index contrast relative to the one or more liquid crystal polymer layers.

18. The filter film of claim 1, wherein the one or more liquid crystal polymer layers is a plurality of liquid crystal polymer layers.

\* \* \* \* \*